US009988891B2

United States Patent
Forstner et al.

(10) Patent No.: US 9,988,891 B2
(45) Date of Patent: Jun. 5, 2018

(54) MONITORING CONTROL AND/OR OPTIMIZATION OF BOREHOLE SIDETRACKING

(71) Applicants: Ingo Forstner, Ahnsbeck (DE); Christian Linke, Hannover (DE)

(72) Inventors: Ingo Forstner, Ahnsbeck (DE); Christian Linke, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 195 days.

(21) Appl. No.: 14/884,377

(22) Filed: Oct. 15, 2015

(65) Prior Publication Data

US 2017/0107808 A1    Apr. 20, 2017

(51) Int. Cl.
| | | |
|---|---|---|
| *E21B 44/00* | (2006.01) | |
| *E21B 7/06* | (2006.01) | |
| *E21B 47/024* | (2006.01) | |
| *E21B 47/12* | (2012.01) | |
| *E21B 49/00* | (2006.01) | |
| *G05B 13/04* | (2006.01) | |

(52) U.S. Cl.
CPC .............. *E21B 44/005* (2013.01); *E21B 7/06* (2013.01); *E21B 7/067* (2013.01); *E21B 47/024* (2013.01); *E21B 47/12* (2013.01); *E21B 49/003* (2013.01); *G05B 13/04* (2013.01)

(58) Field of Classification Search
CPC ........ E21B 44/00; E21B 44/005; E21B 7/061; E21B 7/067; E21B 7/06; E21B 47/024; E21B 47/12; E21B 49/003; G05B 13/041; G05B 13/04
See application file for complete search history.

(56) References Cited

U.S. PATENT DOCUMENTS

| | | | |
|---|---|---|---|
| 4,646,855 | A | 3/1987 | Delinger |
| 5,220,963 | A | 6/1993 | Patton |
| 5,445,220 | A | 8/1995 | Gurevich et al. |

(Continued)

FOREIGN PATENT DOCUMENTS

WO    2015060810 A1    4/2015

OTHER PUBLICATIONS

Calderoni, et al.; "Automated Steering Systems Applied to Complex Horizontal Well in South Italy"; European Geothermal Conference Basel; Sep. 1999; Basel, Switzerland; Proceedings, vol. 2; 10 pages.

(Continued)

*Primary Examiner* — Carib A Oquendo
(74) *Attorney, Agent, or Firm* — Cantor Colburn LLP (57) ABSTRACT

An embodiment of a method of drilling a secondary borehole from a primary borehole includes deploying a drilling assembly at a selected location in the primary borehole in an earth formation, and operating the drilling assembly and a drill bit to form an exit trough in a borehole wall. Operating includes controlling one or more operational parameters including at least a rate of lateral penetration of the drill bit into the formation as a function of time during formation of the exit trough based on at least one of a mathematical model and measurement data collected from one or more sensors, and in response to determining that the exit trough has exited the primary borehole, drilling the secondary borehole away from the primary borehole.

17 Claims, 5 Drawing Sheets

(56) References Cited

U.S. PATENT DOCUMENTS

| | | | |
|---|---|---|---|
| 5,842,149 A * | 11/1998 | Harrell | E21B 44/00 |
| | | | 702/9 |
| 5,894,896 A | 4/1999 | Smith et al. | |
| 6,401,821 B1 | 6/2002 | Kennedy et al. | |
| 6,923,274 B2 | 8/2005 | Rodgers et al. | |
| 7,260,479 B2 | 8/2007 | McElhinney | |
| 7,306,056 B2 | 12/2007 | Ballantyne et al. | |
| 8,201,625 B2 | 6/2012 | Almaguer | |
| 8,596,386 B2 | 12/2013 | Hopkins et al. | |
| 2005/0150692 A1* | 7/2005 | Ballantyne | E21B 7/062 |
| | | | 175/61 |
| 2012/0228032 A1 | 9/2012 | Dewey et al. | |
| 2015/0041137 A1 | 2/2015 | Rodriguez et al. | |
| 2015/0186570 A1 | 7/2015 | Huang et al. | |

OTHER PUBLICATIONS

International Search Report and the Written Opinion of the International Searching Authority, or the Declaration; PCT/US16/057050, dated Jan. 18, 2017; 15 pages.

\* cited by examiner

MONITORING CONTROL AND/OR OPTIMIZATION OF BOREHOLE SIDETRACKING

BACKGROUND OF THE INVENTION

Various types of drill strings are deployed in a borehole for exploration and production of hydrocarbons. A drill string generally includes drill pipe and a bottomhole assembly. The bottomhole assembly includes a drill bit that is rotated from the surface and/or by a downhole drive such as a mud motor.

In some instances, one or more secondary boreholes, referred to as sidetracks, are drilled from an initial or primary borehole. Sidetracking can be performed for various purposes, such as bypassing an unusable section of the primary borehole and exploring or producing from regions away from the primary borehole. Sidetracks can be drilled parallel with the primary borehole or in a deviated path (e.g., horizontal or perpendicular) away from the path of the primary borehole.

BRIEF SUMMARY OF THE INVENTION

An embodiment of a method of drilling a secondary borehole from a primary borehole includes deploying a drilling assembly at a selected location in the primary borehole in an earth formation, and operating the drilling assembly and a drill bit to form an exit trough in a borehole wall. Operating includes controlling one or more operational parameters including at least a rate of lateral penetration of the drill bit into the formation as a function of time during formation of the exit trough based on at least one of a mathematical model and measurement data collected from one or more sensors, and in response to determining that the exit trough has exited the primary borehole, drilling the secondary borehole away from the primary borehole.

An embodiment of a system for drilling a secondary borehole from a primary borehole includes a drilling assembly including at least a drill bit connected to a drill string, the drilling assembly configured to be partially or wholly disposed in a borehole, and one or more sensors operatively associated with the drilling assembly. The system also includes a processor in communication with the one or more sensors and configured to perform a method that includes deploying the drilling assembly at a selected location in the primary borehole in an earth formation and operating the drilling assembly and a drill bit to form an exit trough in a borehole wall. Operating includes controlling one or more operational parameters including at least a rate of lateral penetration of the drill bit into the formation as a function of time during formation of the exit trough based on at least one of a mathematical model and measurement data collected from one or more sensors, and in response to determining that the exit trough has exited the primary borehole, drilling the secondary borehole away from the primary borehole.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are systems and methods for drilling a secondary borehole or sidetrack from a primary borehole, and/or for monitoring a sidetrack drilling operation. The systems and methods use models and/or real time measurements to facilitate or control aspects of a sidetracking operation. The sidetrack operation may be performed manually, semi-automatically or automatically, based on models and/or measurement data.

An embodiment of a method includes generating a mathematical model of a planned sidetrack operation based on information such as drilling assembly descriptions (e.g., geometry and bit properties), borehole geometry, formation properties and planned operational parameters. The model may be used to control the sidetrack operation, and may be updated in real time during the operation and/or after the operation. In one embodiment, the method includes automatically adjusting operational parameters based on real time measurements taken during the operation, such as axial movement, bending measurements and lateral force or side force measurements.

The embodiment described herein can be used to improve or optimize various aspects of sidetracking and related operations. For example, a sidetracking operation can be planned, performed and monitored to reduce or minimize the overall time required to create an exit trough and sidetrack, and minimize or reduce a risk of failing to create an exit hole to a sidetrack that can be used by a drilling assembly to drill the secondary borehole. In addition, sidetracking operations can be planned and performed to avoid unnecessary fatigue or failure of BHAs and other downhole components during formation of a sidetrack and subsequent deployment of components into or past a formed sidetrack.

Various aspects of a sidetracking operation can be improved or optimized using the embodiments described herein, such as side-cutting speed, bit design, and trough and sidetrack geometry. In addition, the operation can be planned to account for the needs of a current or subsequent BHA in drilling long lengths of a sidetrack hole from a completed trough.

Figure 1:
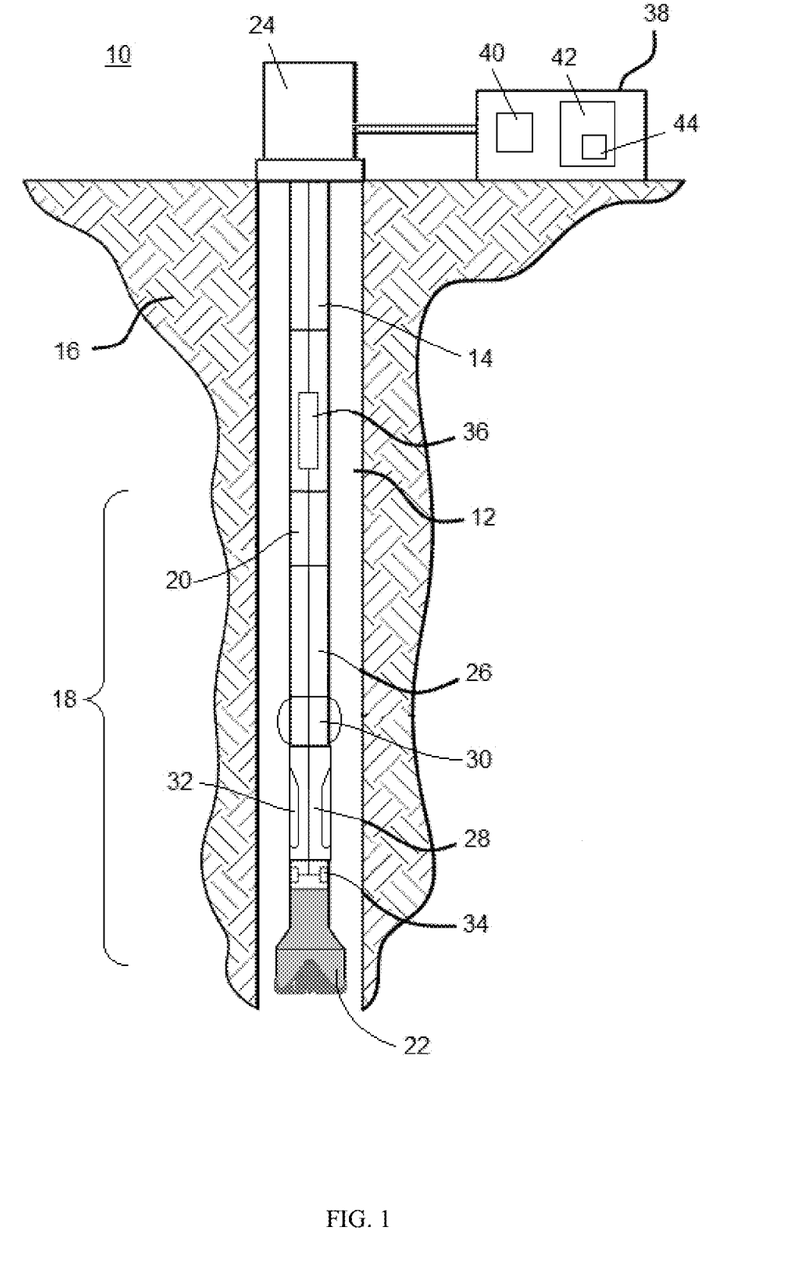
FIG. 1 depicts an exemplary embodiment of a drilling system including a drill string and a drilling assembly disposed in a borehole in an earth formation.

Referring to FIG. 1, an embodiment of a downhole drilling system 10 disposed in a borehole 12 is shown. A drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly and/or bottomhole assembly (BHA) 18. Various measurement tools may also be incorporated into the system 10 to affect measurement regimes such as wireline measurement applications or logging-while-drilling (LWD) applications. For example, a LWD tool 20 is incorporated in the drill string 14.

The BHA includes a drill bit 22 that is attached to the bottom end of the drill string 14 via various components, and is configured to be conveyed into the borehole 12 from a drilling rig 24. The drill bit 22 is rotated by a surface drive and/or a downhole drive such as a mud motor 26. Additional components may include a steering unit 28 and a stabilizer 30.

The steering unit 28 is part of a steering or directional drilling assembly that is configured to change the direction of the drill bit downhole in order to, e.g., change the trajectory of a borehole and/or drill a secondary borehole. The secondary borehole (also referred to as a "sidetrack") may be drilled from a selected location in the borehole 12 (also referred to as a "primary borehole").

The steering unit 28 may include any of various components configured to apply a side force to the drill bit 22 and/or orient the drill bit 22 at an angle relative to the longitudinal axis of the drill string 14 and/or borehole 12. Exemplary steering units or assemblies include bent motor or bent sub steering assemblies and rotary steering systems. The steering unit 28 in the embodiment of FIG. 1 is a rotary steering tool including a plurality of radially extendable force members 32 located at different angular positions on the steering unit 28.

In one embodiment, the drill bit 22 and/or BHA 18 includes one or more sensors 34 and related circuitry for estimating one or more parameters relating to the BHA 18 and/or the borehole 12. For example, the sensors 34 include inclination sensors for measuring, e.g., the inclination of the BHA at a sensor position. Inclination may also be used to model or estimate the angle of the drill bit 22 relative to the longitudinal axis. Strain sensors may be included to measure bending. Accelerometers may also be included to measure, e.g., vibration of the drill bit 22 and/or the BHA 18. Other examples of sensors include a near bit caliper for measuring borehole diameter. In one embodiment, the sensors 34 are coupled to a downhole electronics unit 36, which may receive data from the sensors 34 and transmit the data to a processing system such as a processing unit 38. Various techniques may be used to transmit the data to the processing unit 38, such as mud pulse, electromagnetic, acoustic telemetry, or wired pipe.

The processing unit 38 is connected in operable communication with the BHA 18 and may be located, for example, at a surface location, a subsea location and/or a surface location on a marine well platform or a marine craft. The processing unit 38 may also be incorporated with the drill string 14 or the BHA 18, or otherwise disposed downhole as desired. The processing unit 38 may be configured to perform functions such as controlling drilling and steering, transmitting and receiving data, processing measurement data, monitoring drilling operations, and performing simulations using mathematical models. The processing unit 38, in one embodiment, includes a processor 40 and, a data storage device (or a computer-readable medium) 42 for storing, data, models and/or computer programs or software 44.

Figure 2:
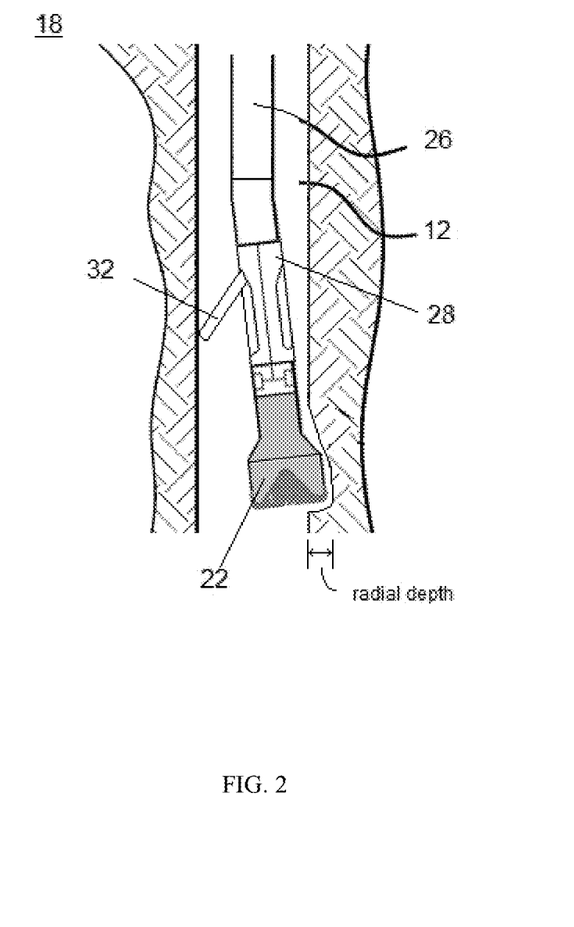
FIG. 2 depicts a portion of the drilling system of FIG. 1, illustrating the drilling assembly during a sidetrack drilling operation.

In one embodiment, the system 10 is operated to perform a sidetrack operation, an example of which is shown in FIG. 2. The sidetrack operation includes deploying the drill bit 22 to a selected primary borehole depth or location. If the borehole 12 is cased at the selected depth, a portion of the casing is milled or otherwise removed prior to drilling the sidetrack. A side force is applied to the drill bit 22 using a suitable component such as a bent motor or, as shown in FIG. 2, one or more of the force members 32. As described herein, a "side force" (also referred to as a lateral force) is a force applied to the borehole wall that has a component in a radial or lateral direction perpendicular to the borehole and/or drill string longitudinal axis. For example, a whipstock or bent motor applies a bending moment that results in a side force being applied to the drill bit, or a force member is extended to apply a side force to the drill bit.

The side force is applied to cut into the side of the borehole 12, during which the drill bit is stationary in the axial direction or is moved in the axial direction by, e.g., applying an axial load (typically referred to as weight-on-bit or "WOB"). A key hole or exit trough is cut into the side of the borehole 12 at a selected angle relative to the borehole axis until a sufficient radial depth is reached so that the trough and the drill bit 22 exit the existing borehole. The trough "exits" the borehole at a point where there is separation between the primary borehole and the laterally drilled trough, and the sidetrack hole has started (i.e., there is formation material between the bottom of the trough and the primary borehole). At this point, the sidetrack can be drilled away from the borehole 12. The trough typically forms a "ramp" that extends axially and has a radial depth that increases with the length of the trough.

The sidetrack operation typically requires operational parameters (e.g., rotational speed, side force, angle, torque and/or weight on bit) during creation of the exit trough that are different than the operational parameters required once the exit trough has been created and the drill bit exits the borehole 12 and drills the actual sidetrack trajectory.

Sidetracking can be time-consuming and comes with a considerable risk of not exiting as planned. For example, sidetracks have been typically drilled blind and without detailed analysis. The amount of time spent drilling at each depth increment is typically guessed rather than calculated or even measured to be right. Thus, there is a significant risk that the trough is not drilled with a sufficient length and depth profile to allow the drill bit to leave the primary borehole.

In addition, troughs of open hole side-tracks may often not be as "smooth" as commonly expected. Thus, sidetracking operations that typically use constant parameters (e.g., WOB and side force) can be inefficient, and can produce exit troughs that pose a risk of causing the drill bit to fall into the primary borehole, and/or do not easily allow subsequent components to be diverted from the primary borehole.

A processor (or multiple processors) is configured to facilitate sidetracking by using information such as models and real time measurements to guide a manual operator, automate some aspects of a sidetracking operation (semi-automatic), or fully automate the operation. The sidetracking operation can be performed using measurement information (real time and/or previously collected), a model of the operation, or using a combination of a model and measurement information.

In one embodiment, a sidetracking process is performed by selecting a sidetrack location, and forming a trough in the side of the borehole by applying a side force to the drill bit 22 using a bent-motor sub, force members 32 or other means, and monitoring parameters such as side force, WOB, angle and drill bit rotational speed.

In one embodiment, the trough is formed by applying operational parameters to affect a selected rate of lateral penetration during a time increment. The rate of penetration depends on various conditions and factors that can be modeled prior to performing an operation so that an optimal rate of lateral penetration can be achieved. Operational parameters such as rotational speed of the drill bit, steering parameters (e.g., angle, side force applied by a force member or bending/deflection applied by a steering unit) and amount of time spent side drilling a section of the trough are planned. During the operation, real time measurements may be performed to validate or update the model and adjust operational parameters as needed.

For example, the side force and/or rate of lateral penetration may be estimated in real time during formation of an exit trough, and used to evaluate the operation and change operational parameters to improve and/or optimize the process. The radial or lateral depth can be estimated based on bending moment, inclination or other measurements, in combination with knowledge of the geometry of portions of the BHA 18 and the drill bit 22. These estimations can be used to derive information such as drilling efficiency, trough depth, trough angle and/or force transfer. The information can also be used to identify potential problems or hazards. The processor could also pick a suitable location in the primary borehole to exit from based on trajectory needs and geology descriptions in the section of interest.

In one embodiment, the sidetracking operation is performed in conjunction with one or more mathematical models of the borehole, formation and/or operational parameters. The model(s) can be generated based on information such as formation properties (e.g., rock type, permeability), drilling assembly or BHA geometry and properties, and borehole geometry and trajectory. Using the model(s), the sidetracking operation is planned, i.e., operational parameters such as WOB, drilling speed and steering parameters are planned as a function of time and/or depth. In one embodiment, the operation is planned to provide an optimized time and/or weight per depth. The model(s) may be used to simulate the sidetracking procedure in the planning phase to select optimized parameters such as exit trough length, ramp angle and position.

In addition, the one or more models may be used to estimate or derive properties of the drilling assembly or BHA, the borehole and/or the exit trough during a sidetracking operation. For example, side forces can be derived based on a force model to which measurements such as strain, bending moment and/or inclination are applied. In addition, side-cutting efficiency can be modeled.

In one embodiment, a model is generated that takes into account variations in properties as the exit trough is formed. For example, side forces, weight transfer and other forces on the drilling assembly or BHA can vary depending on, e.g., the lateral or radial depth of the trough. Whenever the first stabilizer 30 enters the exit trough, gravity impact/side forces on the bit 22 change. So in order to create a smooth trajectory in the trough, varying WOB and/or time increments per measured depth along the primary borehole (the "borehole depth") are planned and executed during the sidetracking operation. For example, at successive borehole depth increments, the amount of side force that can be applied changes (e.g., gets smaller) as the trough gets deeper and extends further along the borehole. Thus, at a first increment, a relatively large side force is applied by a force member or selected bending moment and a first section of the trough is formed over a first time period. At a second successive depth increment, the available side force is reduced (e.g., due to entry of a stabilizer) and the second section of the trough is formed over a longer second time period. In this fashion, successive sections of the trough are formed in a step-wise manner by laterally drilling each section over a successively larger time period.

Additionally, inclination, BHA bending influence in non-straight primary boreholes, bit-design-features, unconfined compressive strength (UCS), among other considerations, can be accounted for during planning, modeling and operation. These often complicated factors can be applied to improve or optimize parameter variations, such as rate of penetration in the axial direction (ROP), WOB and rotational speed (RPM), to create a relatively smooth exit trough.

Figure 3:
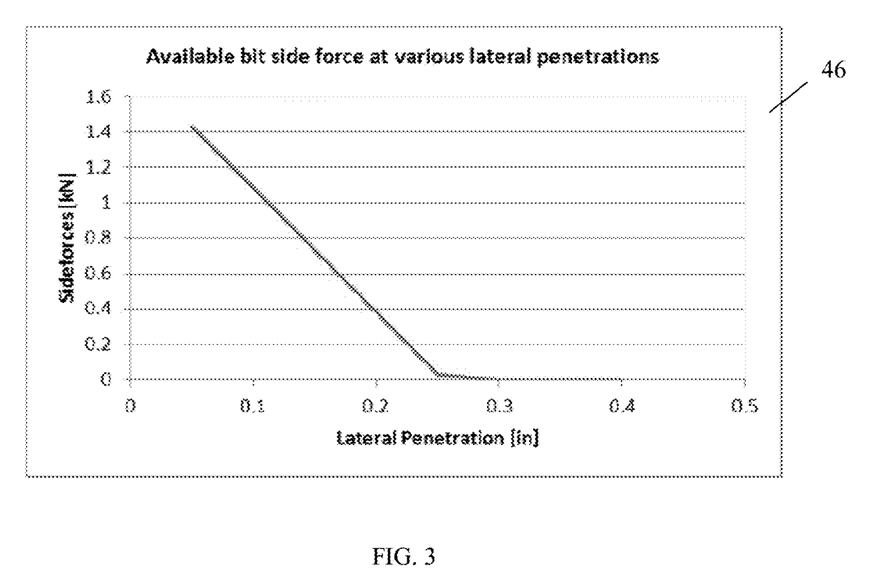
FIG. 3 depicts a model of aspects of a sidetracking operation.

An example of an aspect of a model 46 that can be used during planning and/or execution of a sidetracking operation is shown in FIG. 3. In this example, the model 46 shows variations of available side force as a function of lateral or radial penetration into a borehole.

During side drilling, rock will be removed laterally. The amount of lateral penetration depends on the lateral aggressiveness of the bit, formation properties (e.g., type of rock), ROP and the side force at the bit exerted over time. The side force itself is a function of the BHA set up (mainly stabilizer placement and blade outside diameter), inclination of the drill bit, and curvature of the primary borehole. Simulations have shown that the available side force at the bit is not constant over measured radial depth and there is a varying finite lateral cutting depth as side forces decrease with lateral cutting depth. In the exemplary model 46, the side forces decrease linearly with radial depth and level off at a certain radial depth.

Thus, a sidetracking operation may be planned to have operational parameters set for a specific time or depth interval, and successively increasing or changing in a gradual or step-wise fashion. For example, a planned operation may include a step-wise change in operational parameters for successive time increments. Such operational parameters include angle, WOB and/or rate of penetration for multiple successive depth increments. An additional parameter is the amount of time spent drilling the trough at a given borehole depth increment. Each increment can be designed or optimized to take advantage of the available side force and avoid drilling with parameters that do not provide sufficient side force and drilling efficiency.

Thus, in combination with downhole measurements (e.g., torque, WOB, bending moment and bending moment toolface) the success rate for a side track operation can be significantly increased, as the optimal time spent (and saved) per depth interval may vary, and this may require repetitive non-trivial calculations that can be performed by the processor during planning and in real time.

The planning takes into account that troughs of open hole side-tracks may often not be as smooth as commonly expected. For example, whenever the first stabilizer 30 enters the trough of a section drilled before by the bit, gravity impact/side forces on the bit increase stepwise. In order to create a smooth trajectory in the trough, side force and/or weight on bit is incrementally increased to compensate for changes in geometry due to the stabilizer or other components of the BHA.

The operational parameters may be planned and/or selected based on various factors, conditions and objectives. For example, the operational parameters are selected to minimize an amount of time required to drill an exit trough and/or secondary borehole, and/or reduce or minimize a risk of failure or fatigue of a component of the drilling assembly. The operational parameters may also be selected to reduce or minimize a risk of failing to create a blind hole that can be used as the start of a sidetrack hole drilled with the drilling assembly or BHA to an estimated or even quantified level considered acceptable.

In addition, the operational parameters may be planned and/or selected to form a geometry of the exit trough that ensures that a drilling assembly and/or a subsequent drilling assembly, BHA or other carrier enters the primary borehole or the secondary borehole as desired, and that avoids a risk of failure or fatigue of a component of the drilling assembly. For example, the geometry should be planned and formed to minimize or reduce the risk of failure and/or fatigue of the current or subsequent BHAs or strings (e.g., drilling BHAs, logging BHAs, casing, liner, completion equipment such as ESPs, etc.)

In one embodiment, the planning phase is used to plan or select parameters and plan the drilling process so that side-cutting speed at the bit is maximized as much as possible and the operation and downhole components are resilient against inadvertently leaving the exit trough and re-entering the primary borehole, e.g., by planning the drilling process to ensure smooth stabs by considering weight transfer issues. In addition, the planning may be balanced against the needs of subsequently drilling the following sidetrack for extended lengths away from the side trough, e.g., lengths of hundreds of meters or more. For example, the parameters are planned to produce a relatively high bent angle of a BHA (or other carrier) for trough creation and a relatively low bent angle for subsequent drilling. Planning may also include designing and/or selecting a drill bit to cut aggressively to the side for the trough (and also balanced with what is needed afterwards).

Figure 4:
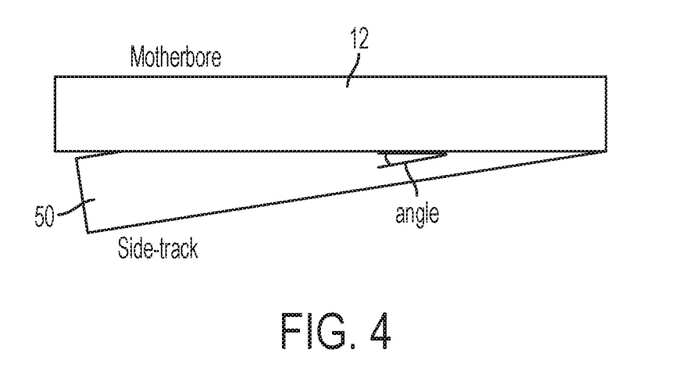
FIG. 4 depicts a planned sidetrack according to embodiments described herein.
Figure 5:
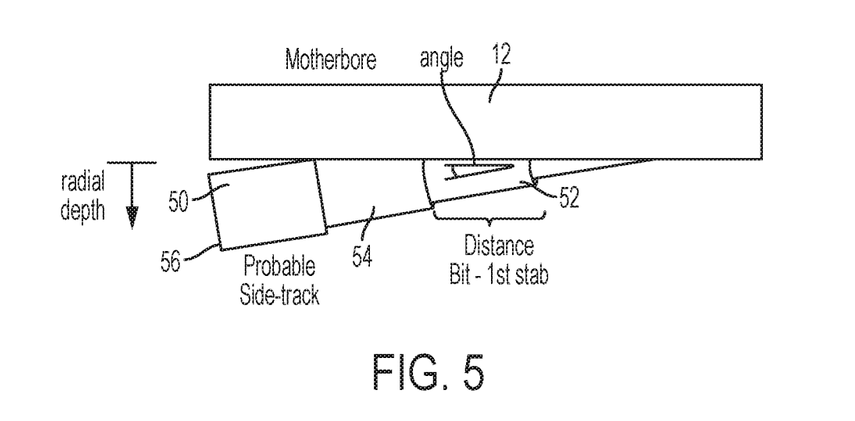
FIG. 5 depicts a sidetrack resulting from blind drilling or drilling according to constant operational parameters.

FIGS. 4 and 5 show examples of a planned exit trough and sidetrack. In these examples, a sidetracking operation is planned by selecting various operational parameters such as location or depth of the primary borehole, steering parameters, side force and RPM at various times, axial depths and/or trough depths, and amount of time spent drilling a section of a trough. FIG. 4 shows a simplified illustration of a planned sidetrack 50 having a smooth geometry, which shows the angle of the sidetrack 50 (the trough angle) relative to the primary borehole 12, the length of the trough required to drill the sidetrack and radial depths of the trough leading to the separate sidetrack. Although the trough ramp is shown as straight, it may be curved in some instances. Embodiments described herein are capable of forming such a smooth trough and sidetrack by controlling operational parameters based on models, pre-collected measurement data and/or real time measurement data. For example, the sidetrack is formed by side drilling the trough in successive time increments. During each time increment, a section of the trough is side drilled by applying a planned steering parameter (actuating a force member or orienting a bent motor) and rotational speed that results in an expected amount of side force and rate of lateral penetration. The section is side drilled for an amount of time necessary to achieve the desired lateral depth and angle. In the next time increment, the steering parameter and rotational speed may be changed based on the model to compensate for changes in formation properties and/or available side force. During each successive time period, the corresponding section is side drilled according to the model (which may be adjusted or calibrated based on real time measurements). In this way, a smooth trough and sidetrack can be created.

FIG. 5, in contrast, shows a potential sidetrack and trough resulting from performing a sidetracking operation without adjusting operational parameters according to embodiments described herein. Due to conditions such as changes in available side force, discontinuities in the borehole geometry and/or changes in formation properties (e.g., due to drilling through different layers), side drilling using constant parameters can result in a "staircase" profile of the sidetrack. For example, the sidetrack of FIG. 5 includes successive sections 52, 54 and 56, each of which has a different depth or ramp profile.

Embodiments of sidetracking operations described herein may be performed manually by an operator to follow a planned operation. Alternatively, the process is entirely automated or only portions are automated.

For example, a sidetracking operation may be performed as an automated procedure based on case-specific modeling and/or measured data rather than generic simplistic rules. The operation is flexible in that operational parameters (e.g., ROP, RPM and/or WOB) can be changed over time in response to changing conditions (e.g., changes in formation properties due to formation layers and changes in available side force).

For example, a model may be generated to predict or estimate changes in the rate at which the trough is formed (e.g., how fast the bit would drill sideways into the trough). Inputs to the model include, e.g., geometry of BHA sections, operational parameters and formation properties. The model can output estimations of available side force at different primary borehole diameters and trough depths. Measurements such as real time bending moments and near-bit caliper data can be used to confirm or calibrate the model, and adjust operational parameters based on changes in downhole conditions. For example, bending load, caliper, vibration, or logging data could also be used to calibrate the primary borehole geometry at the exit depth range, especially in an early step in the automated procedure and/or prior to the exit trough being created.

In addition to facilitating sidetracking, the modeling and downhole measurements can be used to guide and improve subsequent operations. For example, liner/casing running procedures and parameters (e.g. ROP, whether there is a need for rotation) could be improved or optimized depending on the identified exit geometry and environment.

The automated process could also ensure the right parameters and procedures whenever a downhole tool or component is deployed in order to, e.g., accurately locate the exit location of the sidetrack, avoid damaging the trough geometry and ensure that the component follows the sidetrack or primary borehole as desired.

Figure 6:
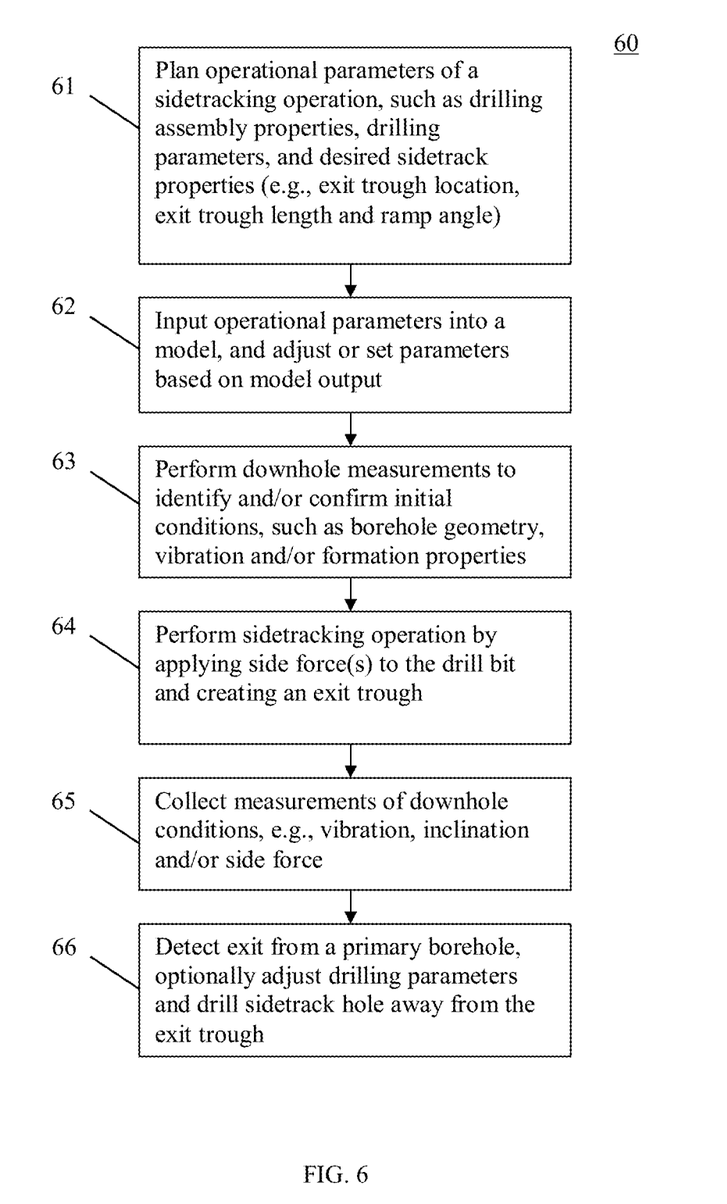
FIG. 6 is a flow chart depicting an embodiment of a method of forming a secondary borehole or sidetrack from a primary borehole.

FIG. 6 illustrates aspects of an exemplary method 60 of planning, performing and/or evaluating a sidetracking operation. The method may be executed by a computer processing system (e.g., the processing unit 38) via programs or software for modeling, calculating and/or controlling aspects of the operation. Exemplary components of such a computer processing system include, without limitation, at least one processor, storage, memory, input devices, output devices and the like. The method may be performed using components of the system 10 and the steering unit 32, but is not so limited and may be used with any device or system capable of drilling a sidetrack. The method 60 includes one or more stages 61-66. In one embodiment, the method 60 includes the execution of all of stages 61-66 in the order described. However, certain stages may be omitted, stages may be added, or the order of the stages changed.

In one embodiment, the method 60 incorporates a borehole, formation and/or drill bit model, which may be used to facilitate planning and/or performing the sidetracking operation. The model may be used in conjunction with downhole measurement data, but is not so limited. For example, the method 60 may be performed using real time or pre-collected measurement data with the model, or in the absence of a model.

In the first stage 61, pre-existing information and/or data collected from downhole measurements is used to plan operational parameters of the sidetracking operation. Various conditions affect how the sidetrack is performed, especially how the exit trough is drilled.

Operational parameters are planned to achieve formation of the trough at a desired location of the sidetrack relative to a primary borehole, the length of the exit trough (in a direction approximately parallel to the primary borehole axis), and the angle of the trough trajectory or ramp relative to the primary borehole and/or drilling assembly axis (also referred to as the "trough angle").

In one embodiment, the radial depth of the trough as a function of primary borehole depth is planned or estimated. For example, the radial depth may gradually increase to form a ramp into the sidetrack, or the depth may be selected to change in a step-wise manner. The radial depth or depth pattern may be adjusted during the operation based on, e.g., updated measurements of borehole geometry, vibration, rotation speed and/or other measurements.

A targeted or ideal rate of radial penetration as a function of depth is planned to balance the needs of reducing the time needed while preserving the integrity of the drill bit (e.g., avoid excessive wear or damage) as well as the trough and exit into the sidetrack.

Other operational parameters include the setup of a drilling assembly and/or BHA to be used in drilling the sidetrack. For example, a drill bit type is selected and a steering system is selected, such as a rotary steerable or motor steered system. Other aspects of the drilling assembly and/or BHA are selected, such as motor bend angle, the number and type of flex sections, and the number, axial position and diameter of stabilizers or other components of the drilling assembly and/or BHA. The operational parameters are selected based on various expected conditions downhole, such as formation properties (e.g., rock type) and primary borehole geometry and trajectory.

The geometry of the BHA and the stabilizer length, diameter and position relative to the drill bit is important information and can be used to estimate the amount of side force available for drilling the trough and exiting the trough, as well as the amount of bending that can be accomplished, which affects the operational parameters as well as the angle of the trough. For example, the amount of side force that can be applied and the amount of bending that can be achieved depends on the geometry of the bit and stabilizer. Based on these factors, the amount of time needed to drill a section of the trough can be estimated. For example, a large stabilizer may only permit about 2 inches of depth to be drilled in 10 minutes, where a smaller stabilizer can allow to drill the same amount in half the time.

Another planned parameter is the axial length of the trough required to allow the drill bit to completely exit the primary borehole and start drilling the separate sidetrack. The length is based on the angle of the drill bit formed by applying the side force, which is selected based on, e.g., formation properties and BHA or drilling assembly geometry.

The operational parameters may also be selected based on identification of the risk that a subsequently deployed tool will fail or follow the wrong path. This risk can be planned for by selecting an appropriate trough angle and length. In addition, parameters of subsequent tools can be specified, such as stabilizer diameter, or diameter and flexibility of casing to be deployed into the borehole or the sidetrack. For example, the trough can be selected to have a relatively high angle and short length, which can facilitate fast exit, however if a subsequently deployed casing is too stiff, a fast exit could prevent the casing from entering the sidetrack. Thus, the exit angle and/or casing properties can be selected during the planning stage.

The various parameters may be balanced if desired to provide a BHA and/or drilling assembly that can be used for both drilling the trough (side drilling) and drilling the sidetrack once the trough ramp is complete. Other considerations include the desired path of subsequent drilling assemblies to prevent a subsequent BHA (e.g., during a casing run or subsequent drilling) from entering the sidetrack when it is not desired. For example, the angle, length and depths of the exit trough are selected so that a drilling assembly or BHA can be steered into a sidetrack if desired, but can bypass the sidetrack if desired. In addition, the risk of a BHA and/or drilling assembly entering the sidetrack is quantified based on the planned exit trough.

In addition, the resilience of the BHA and/or drilling assembly against exiting the trough is quantified or modeled based on, e.g., weight transfer requirements, BHA geometry and formation properties. "Resilience" refers to the ability of the BHA to stay in the trough and resist accidently jumping out of the trough back into the primary borehole. Resilience can be a function of WOB and side force, as well as the presence of ledges and layered formations, and can also be a function of vibration level and rotational speed. Resilience is an estimation of how easy it is for the BHA to accidently exit the trough and re-enter the primary borehole if disturbed by these effects. The resilience corresponds to a risk that the drill bit will inadvertently leave the exit trough and re-enter the primary borehole. Examples of reasons or conditions on which the estimated resilience could be based include normal contact forces inside the trough, vibration level, smoothness of a borehole surface, stiffness of the lower BHA or other carrier, toolface direction of the trough and others.

For example, the formation type is estimated to determine the drilling speed and side force needed to cut into the side of the borehole at a selected rate. In addition, weight transfer from WOB to the side force is estimated based on downhole measurements and/or modeled parameters.

In the second stage 62, various operational parameters are input into a model such as a force model that outputs data such as available side force as a function of radial depth, such as the model 46. Based on the output of the model, one or more of the operational parameters are adjusted or selected as needed.

The model may be calibrated based on data collected from the primary borehole and/or data collected from other wells (e.g., an offset well or other wells in the same or similar formations). Among the model parameters that can be calibrated include vibration spectrum vs. exit trough geometry, exit success vs. trough geometry, and/or side-cutting speed of similar bits in similar formations.

In the third stage 63, initial conditions are measured and/or confirmed (e.g., by comparison with the model and/or pre-collected data) by performing various downhole measurements.

For example, a near-bit caliper or other tool is used to measure the diameter of the borehole at and near the selected location. Diameter measurements are taken at multiple locations at and above the selected location to identify the trajectory and geometry of the borehole as well as any changes in geometry, such as ledges, that could affect drilling the trough and/or entering the sidetrack. In addition, the vibration spectrum of the drill bit may be measured and used to identify normal vibration conditions.

Based on the model and initial conditions, operational parameters as a function of time and/or measured borehole depth are selected. Exemplary operational parameters include steering parameters and rotational speed required at each time increment to effect an optimal or near optimal rate of lateral penetration. At each time increment, the planned operational parameters are associated with a time increment or time period required to drill the corresponding section of the trough to the desired radial depth and trough angle. As indicated above, the amount of available side force may be limited by BHA and borehole geometry, thus the operational parameters are selected to achieve a maximum amount of side force so as to minimize the amount of time required to drill each trough section.

In the fourth stage 64, during the operation, the BHA is urged to the side with the planned rotational speed and other operational parameters that result in a desired or maximum available side force. This is performed, e.g., by providing commands to extend the force members or ribs or steer the drill bit according to the model. The drilling may be performed automatically by the processor, or in cooperation with a user or operator. For example, the sidetracking operation includes automatically controlling the operational parameters by a processor based on the model, and/or automatically adjusting the operational parameters in real time based on the measurement data.

In one embodiment, the drilling is performed in a step-wise manner, during which an initial section of the trough is drilled during a first time period. At the end of the time period, operational parameters such as steering parameters, WOB, rotational speed and/or angle are adjusted and drilling continues. Any number of steps may be drilled until the drill bit exits the borehole. Each step may be drilled when the drill bit is held at a relatively constant borehole depth, or while the drill bit advanced along the borehole at a selected speed.

The drilling may be performed in a step-wise or substantially continuous manner (or a combination thereof) by forming an initial length of the exit trough using a first set of operational parameters, and forming one or more successive lengths of the exit trough using one or more second sets of parameters. One or more of the second sets of parameters are different than the first set of constant parameters. The sets of parameter may be any number of sets of parameters. The parameters during each step may be selected in a step-wise fashion, i.e., the parameters are held substantially constant during each step, or the parameters may be changed continuously or periodically during one or more steps.

In the fifth stage 65, various measurements of downhole conditions are performed during the sidetracking operation. Measurements such as side force, bending moment, inclination or deflection, WOB and ROP are collected to determine whether the sidetrack operation is proceeding as planned (e.g., whether measured data confirms expectations) and adjust operational parameters if desired.

Vibration may be measured to monitor the drill bit and determine whether potential problems are developing and/or to adjust parameters such as side force, WOB and drilling speed to increase efficiency and avoid damage. For example, accelerometers or other suitable sensors measure the vibration spectrum both during formation of a trough and exiting from the trough.

Also during the operation, the model may be calibrated as downhole conditions change and/or measurements are different than those expected. For example, the model may include estimates of vibration as a function of trough geometry, which can be adjusted.

Various measurements may be performed and compared to initial or modeled estimates. For example, the force transfer of WOB exerted above the drill bit to side force is estimated. Parameters such as the WOB, drilling rotation speed and side force can be adjusted based on the quantified resilience. Downhole axial load sensors can aid in determining how much of the applied axial force is transferred to the bit. This can change relative to models as weight can be consumed by discontinuities or ledges in the borehole wall interacting with BHA components such as reamers and stabilizers.

In the sixth stage 66, vibration is periodically or continuously measured in real time to monitor the drill bit and BHA, and also to determine the point at which the drill bit exits the borehole. Once the exit is identified, parameters are adjusted to start drilling the actual sidetrack away from the primary borehole. For example, the WOB is increased once the drill bit has exited the primary borehole (e.g., from a few pounds during side drilling to hundreds of pounds once in the sidetrack), and the drill bit is steered to drill the sidetrack along a selected trajectory away from the primary borehole. This increase should not be affected too soon, as the drilling assembly could jump back into the primary borehole or destroy the trough and/or ramp shape.

For example, when the trough exits the primary borehole, a blind hole begins and the drill bit enters the blind hole (the start of the sidetrack). Once sufficient lateral or radial depth is reached, there will be formation material between the bottom part of the trough and the primary borehole. When the drill bit is in the blind hole, it cannot move up again and the vibration characteristics change. The change in vibration characteristics is detected to determine that the trough and the drill bit have exited the primary borehole.

In one embodiment, until the trough exits the primary borehole, significant WOB is not applied to the BHA and most or all of the cutting is performed laterally (to the side). Once the exit is identified and the drill bit is in the sidetrack hole, it is unlikely that applying WOB will cause the BHA to jump back into the primary borehole and the sidetrack can be further drilled with an applied axial load.

Embodiments described herein may also be applicable to forming portions of a trough and/or sidetrack through features formed or deployed in the borehole. In one embodiment, the method 60 (or at least portions thereof) is used to form a trough through a portion of casing and cement of a cased borehole. In another embodiment, the method 60 is used to form a trough and/or portion of a sidetrack in cement or another solid feature (e.g., a cement plug) in a borehole.

For example, planning of a sidetracking operation includes modeling operational parameters for milling through a casing section using, e.g., a drilling assembly or BHA having a mill instead of a drill bit. The modeling may include modeling bending and/or axial loads relative to the geometry of the BHA, which can assist in selecting the BHA setup and components.

In addition, measurements of vibration, bending load and penetration or rotational speed may be modeled prior to milling to provide guidance in determining when the mill has successfully drilled through the casing and cement. In addition, these measurements may be used to evaluate the quality of cement through which a trough is formed. For example, measurements of bending load and penetration speed can provide information, when compared to a model or other data, regarding the strength of cement.

The methods described herein may not only be used to improve or optimize a specific milling and/or sidetracking operation, but may also be used to generate offline general procedures for use in subsequent sidetracking operations. For example, information obtained from performing a sidetracking operation and verifying models can be used to generate procedures for similar formations using similar BHA setups.

In addition to improving and/or optimizing sidetracking, the methods described herein also facilitate subsequent operations. For example, the path of the sidetrack and exit point can be designed so that subsequent casings or liners do not inadvertently enter the sidetrack, and so tools and the borehole are not damaged as the tool is run past or diverted into the sidetrack. In addition, the sidetrack is designed so that subsequent BHAs, tools or other carriers can be run in the primary borehole or diverted to the sidetrack.

The systems and methods described herein provide various advantages over prior art techniques. For example, embodiments described herein are capable of forming an exit trough that is more precisely drilled and designed than is feasible with prior art techniques. The shape and length of an exit trough and sidetrack can be effectively drilled so that damage to the primary borehole and subsequent tools can be avoided. The outcome is a more reliable exit from the primary borehole, as well as reduced time spent creating the exit. In addition, the exit can be designed to optimize or reduce the time taken for subsequent tools to exit the primary borehole.

Furthermore, planning and drilling according to embodiments described herein takes into account changes in shape and diameter of the borehole to improve performance of the operation. Contrary to prior art techniques, which typically assume a round and constant gauge borehole, embodiments described herein recognize and account for ledges and other discontinuities.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 42 or the processing unit 32. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force, or a rotational force), digital signal processor, analog signal processor, sensor, magnet, antenna, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of drilling a secondary borehole from a primary borehole, comprising:
   deploying a drilling assembly at a selected location in the primary borehole in an earth formation;
   operating the drilling assembly and a drill bit to form an exit trough in a borehole wall, wherein operating includes:
   controlling one or more operational parameters including at least a rate of lateral penetration of the drill bit into the formation as a function of time during formation of the exit trough based on at least one of a mathematical model and measurement data collected from one or more sensors,
   wherein the model is of at least one of the drilling assembly, a portion of the primary borehole and properties of a bulk formation or of a sequence of formations at the selected location, and wherein the model includes an estimated available lateral force as a function of radial depth of the exit trough, the estimated available lateral force based at least on a geometry of a portion of the drilling assembly;
   in response to determining that the exit trough has exited the primary borehole, drilling the secondary borehole away from the primary borehole.

2. The method of claim 1, wherein the drilling assembly includes one or more stabilizers, and controlling includes adjusting at least one of the rate of lateral penetration and an amount of time spent at a primary borehole depth based on a location of the one or more stabilizers relative to the exit trough.

3. The method of claim 1, wherein the one or more sensors includes a sensor configured to measure a diameter of the borehole, the measurement data includes an indication of a discontinuity in the diameter of the borehole at an axial location of the borehole, and controlling includes adjusting at least an amount of time spent forming the trough at the axial location based on the indication.

4. The method of claim 3, further comprising estimating a resilience of the drilling assembly based on at least one of the one or more sensors and the indication of the discontinuity, the resilience corresponding to a risk that the drill bit will inadvertently leave the exit trough and re-enter the primary borehole.

5. The method of claim 1, wherein controlling includes forming an initial length of the exit trough using a first set of operational parameters, and forming one or more successive length of the exit trough using one or more second sets of parameters, wherein at least one of the one or more second sets of parameters are different than the first set of operational parameters.

6. The method of claim 1, wherein controlling includes automatically controlling the operational parameters by a processor based on the model.

7. The method of claim 1, wherein the measurement data includes real time vibration measurements, determining that the exit trough has exited is performed based on a change in vibration of the drill bit, and drilling away from the exit trough includes increasing an axial load on the drilling assembly.

8. The method of claim 1, further comprising generating the model during a planning stage prior to the operating, wherein controlling includes applying the measurement data in real time to the model during the operating, and adjusting the one or more operational parameters based on applying the measurement data.

9. A system for drilling a secondary borehole from a primary borehole, the system comprising:
  a drilling assembly including at least a drill bit connected to a drill string, the drilling assembly configured to be partially or wholly disposed in a borehole;
  one or more sensors operatively associated with the drilling assembly; and
  a processor in communication with the one or more sensors, the processor configured to perform a method including:
    deploying the drilling assembly at a selected location in the primary borehole in an earth formation;
    operating the drilling assembly and the drill bit to form an exit trough in a borehole wall, wherein operating includes:
    controlling one or more operational parameters including at least a rate of lateral penetration of the drill bit into the formation as a function of time during formation of the exit trough based on at least one of a mathematical model and measurement data collected from the one or more sensors,
    wherein the model is of at least one of the drilling assembly, a portion of the primary borehole and properties of a bulk formation or of a sequence of formations at the selected location, and wherein the model includes an estimated available lateral force as a function of radial depth of the exit trough, the estimated available lateral force based at least on a geometry of a portion of the drilling assembly;
    in response to determining that the exit trough has exited the primary borehole, drilling the secondary borehole away from the primary borehole.

10. The system of claim 9, wherein the primary borehole includes a casing, the drilling assembly is configured to drill laterally through the casing, and operating includes forming the exit trough through the casing.

11. The system of claim 9, wherein the one or more operational parameters are selected to minimize or reduce a risk of failing to create the exit trough to the secondary borehole that can be used by the drilling assembly to subsequently drill an extended length of the secondary borehole.

12. The system of claim 9, wherein the one or more operational parameters are selected based on the model and controlled to form the exit trough and allow the drilling assembly to continue drilling a sidetrack away from the borehole subsequent to forming the trough.

13. The system of claim 9, wherein the rate of lateral penetration is controlled by at least one of a lateral force applied to the drill bit and a bending moment of a steering unit.

14. The system of claim 9, wherein the model includes estimates of conditions expected to be experienced during a sidetracking operation, the conditions including at least one of bending loads, deflections and contact forces on the drilling assembly.

15. The system of claim 9, wherein the model includes estimates of trough formation speed as a function of at least one of a lateral force on the drill bit and properties of the formation along a planned length of the exit trough.

16. The system of claim 9, wherein the operational parameters are selected to minimize an amount of time required to drill the secondary borehole and reduce a risk of failure or fatigue of a component of the drilling assembly.

17. The system of claim 9, wherein the operational parameters are selected to form a geometry of the exit trough that ensures that at least one of the drilling assembly and a subsequent carrier enters one of the primary borehole and the secondary borehole as desired, and avoids a risk of failure or fatigue of a component of the drilling assembly.

* * * * *